United States Patent [19]

Bogart et al.

[11] Patent Number: 4,584,102

[45] Date of Patent: Apr. 22, 1986

[54] PROCESS FOR THE BIOLOGICAL DEGRADATION OF HAZARDOUS WASTE BY-PRODUCTS

[76] Inventors: John D. Bogart, P.O. Box 623, Laurel, Miss. 39441; Charles W. Hawk, P.O. Box 18225, Pensacola, Fla. 32523

[21] Appl. No.: 772,847

[22] Filed: Sep. 5, 1985

[51] Int. Cl.$^4$ .......................................... C02F 11/02
[52] U.S. Cl. .................... 210/610; 210/620; 210/747; 210/170; 405/128
[58] Field of Search ............... 210/747, 170, 751, 600, 210/620, 601, 609, 610; 405/128, 129

[56] References Cited

U.S. PATENT DOCUMENTS

| | | | |
|---|---|---|---|
| 4,162,976 | 7/1979 | Monson | 210/170 |
| 4,347,140 | 8/1982 | Condolios et al. | 210/747 |
| 4,439,062 | 5/1984 | Kingsbury | 405/129 |
| 4,448,690 | 5/1984 | Maphis | 405/128 |
| 4,464,081 | 8/1984 | Hillier et al. | 405/128 |
| 4,473,477 | 9/1984 | Beall | 210/747 |

FOREIGN PATENT DOCUMENTS 2141732  1/1985  United Kingdom ............... 210/603

Primary Examiner—Benoit Castel
Attorney, Agent, or Firm—Harvey B. Jacobson; Clarence A. O'Brien

[57] ABSTRACT

A method of decontaminating an impoundment in which waste-water and sludge from a pressure wood treating plant or other industry is stored by constructing a treatment unit in a portion of the lagoon or impoundment, pumping clean water into the treatment unit, adding the sludge to the treatment unit, adding a mixture of mutant bacteria, nutrients, and emulsifiers to the treatment unit, continuously aerating the mixture in the treatment unit, and analyzing samples taken from the treatment unit at regular intervals until the waster water and sludge are substantially free of detectable hazardous contituents.

4 Claims, 2 Drawing Figures

PROCESS FOR THE BIOLOGICAL DEGRADATION OF HAZARDOUS WASTE BY-PRODUCTS

BACKGROUND OF THE INVENTION

1. Field of the Invention

The present invention relates to a process for the biological degradation of waste by-products, and specifically, to a method of degrading hazardous waste by-products produced by pressure wood treating plants, and other industries.

2. Description of the Prior Art

Many pressure wood treaters utilize ponds or lagoons as a method of storing or disposing of waste process water. However, most entities in this industry have been or are being required to reconstruct the lagoons or close and discontinue use of the lagoons in order to comply with federal environmental regulations. Therefore, a need exists for an effective and economically feasible method of degrading the waste products in such a lagoon or impoundment so that the contents are rendered environmentally safe prior to closure. Moreover, an alternate means of eliminating hazardous waste by-products must be provided prior to or at the time the impoundment is closed in order to decontaminate the toxic wastes which continue to be generated by the pressure wood treating plant.

Thus, it is an object of the present invention to provide a method of degrading hazardous waste by-products generated by pressure wood treating plants and other industrial entities.

It is a further object of the present invention to provide a method of decontaminating hazardous industrial waste-water which utilizes mutant bacteria to enhance the speed of the natural biodegradation process.

SUMMARY OF THE INVENTION

These and other objects are accomplished according to the method of the present invention by constructing a treatment unit in a portion of a lagoon or impoundment in which waste water and sludge are stored, pumping clean water into the treatment unit, adding the sludge to the treatment unit, adding a mixture of mutant bacteria, nutrients, and emulsifiers to the treatment unit, continuously aerating the mixture in the treatment unit, and analyzing samples taken from the treatment unit at regular intervals until the waste water and sludge are substantially free of detectable hazardous constituents. The process of the present invention can be used in any industry which utilizes lagoons or impoundments as a method for storing organic biodegradable hazardous waste streams, such as paper and pulp industries, metal plating industries, petroleum industries and pesticide plants.

DESCRIPTION OF THE PREFERRED EMBODIMENT

A treatment unit 1 according to the present invention is prepared by first removing sludge from a portion of an existing impoundment or lagoon in which waste-water and sludge are stored. A separation wall or dike is built to separate the excavated area from the remainder of the impoundment. Although the separation wall or dike is preferably made of clay, any other suitable material, such as fill dirt, sand, cement or poly-synthetic (plastic) dams, may be used. The excavated sludge is stored in the remaining portion of the impoundment.

Figure 1:
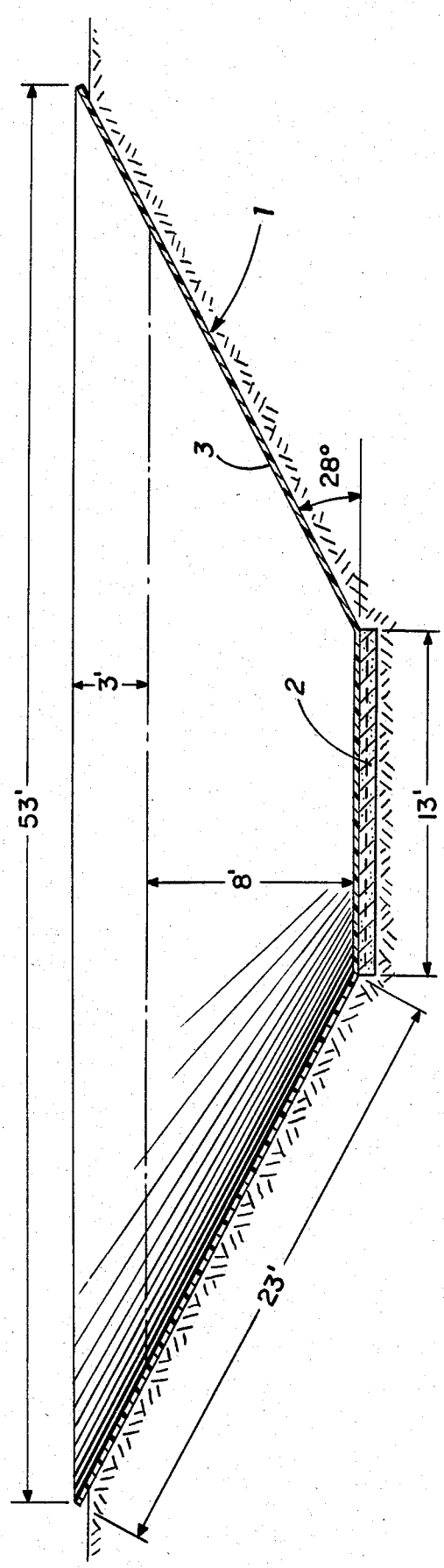
FIG. 1 is a cross-sectional view of the biological treatment unit of the present invention.

The treatment area 1 is graded into a bowl shape, as shown in FIG. 1. A wire-reinforced concrete slab 2 is poured at the base of the bowl-shaped treatment area. The size and depth of each treatment unit necessarily varies with the needs and available space of the lagoon or impoundment being decontaminated.

A water-proof liner 3 is spread in the treatment area. The liner can be made of urethane or any other suitable water-proof material. The liner then is checked for leaks.

Clean water is pumped into the treatment unit 1. A flow meter may be used to measure the volume of water added. The volume of the water is marked at one-foot intervals on the side of the treatment unit. In a preferred embodiment of the method of the present invention, water is added until the water reaches the 8 feet mark.

Figure 2:
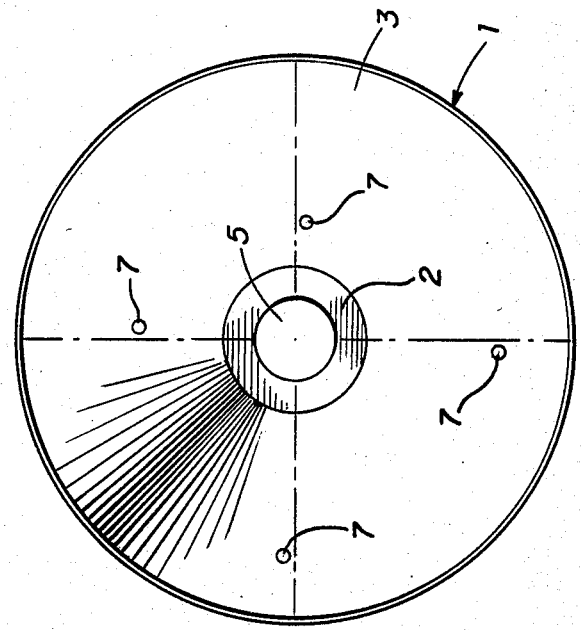
FIG. 2 is an aerial view of the biological treatment unit of the present invention showing the locations for obtaining samples in accordance with the process of the present invention.

An aerator 5 is positioned and secured in the center of treatment unit 1, as shown in FIG. 2. Preferably, a lance pump is made available at the treatment site, in the event additional sediment agitation is needed.

Upon starting the aerator, the sludge which is in the remainder of the impoundment is added to the treatment unit, and the aerator is operated continuously to insure that all material is suspended. The volume of sludge added to the treatment unit is recorded to aid in determining the amount of mutant bacteria which is required to decontaminate the lagoon.

A commercially available mixture of microorganisms, together with nutrients and emulsifiers, is added to the treatment unit. A suitable mixture of mutant bacteria is manufactured and sold under the name Hydrobac-CL by Polybac Corporation, 1251 South Cedar Crest Blvd., Allentown, Pa. 18103. Suitable bacteria may also be obtained by culturing the naturally occurring bacteria from the actual lagoon site. The pH of the mixture in the treatment unit is adjusted to between about 7 to 7.5.

Samples are taken from the treatment unit at the four sampling locations 7 shown in FIG. 2. The following procedure may be used to obtain the samples:

(1) Continue running the aerator for one hour.
(2) Measure the dissolved oxygen (DO) with a probe on a pole while the aerator is running.
(3) Turn off aerator 5, and sample at sampling locations 7, shown in FIG. 2. The samples must be taken at least one foot below the surface.
(4) Measure the DO uptake for each sample.
(5) Allow the mixture in treatment unit 1 to settle for one hour.
(6) Pull four samples of water and four samples of sediment, at least one quart each, from the locations 7 shown in FIG. 2.
(7) Consolidate the four water samples in a clean five gallon pail, mix well, and take a full-quart sample for laboratory analysis of the following constituents and data:
   (a) TOC;
   (b) ammonia nitrogen;
   (c) orthophosphate;
   (d) oil and grease;

(e) organic chloride;
(f) K001 hazardous constituents;
(g) pH; and
(h) % solids.

Return the remainder of the water samples to the treatment unit.

(8) Consolidate the four sediment samples in a clean five gallon pail, mix well, and take a full-quart sample for laboratory analysis of the following constituents and data:
 (a) TOC;
 (b) oil and grease;
 (c) inorganic chloride;
 (d) K001 hazardous constituents;
 (e) pH;
 (f) % solids; and
 (g) density.

(9) Return remainder of the sediment samples to treatment unit, and restart aerator.

The treatment unit 1 is monitored at regular intervals by taking samples according to the above described procedure.

A typical waste-water impoundment is generally considered environmentally safe when the constituents of the mixture in the treatment unit are below the detection limits set forth in the following tables:

TABLE 1

| K001 PARAMETERS | Detection Limit Water Phase (mg/l) |
|---|---|
| 2-chlorophenol | 0.1 |
| phenol | 0.1 |
| 2,4-dimethylphenol | 0.1 |
| 2,4,6-trichlorophenol | 0.5 |
| p-chloro-m-cresol | 0.1 |
| tetrachlorophenol | 1.0 |
| 2,4-dinitrophenol | 2.0 |
| pentachlorophenol | 1.0 |
| naphthalene | 0.1 |
| acenaphthene | 0.1 |
| phenanthrene + anthracene | 0.5 |
| fluoranthene | 0.5 |
| chrysene + benzo(a)anthracene | 0.5 |
| benzo(b)fluoranthene + benzo(k)fluoranthene | 0.5 |
| benzo(a)pyrene | 0.5 |
| indeno(1,2,3-cd)pyrene + dibenzo(a,h)anthracene | 0.5 |
| carbazole | 0.5 |

TABLE 2

| K001 PARAMETERS | Detection Limit Sediment Phase (ppm dry) |
|---|---|
| 2-chlorophenol | 10 |
| phenol | 10 |
| 2,4-dimethylphenol | 10 |
| 2,4,6-trichlorophenol | 20 |
| p-chloro-m-cresol | 10 |
| tetrachlorophenol | 10 |
| 2,4-dinitrophenol | 10 |
| pentachlorophenol | 10 |
| naphthalene | 10 |
| acenaphthene | 10 |
| phenanthrene + anthracene | 20 |
| fluoranthene | 20 |
| chrysene + benzo(a)anthracene | 20 |
| benzo(b)fluoranthene + benzo(k)fluoranthene | 20 |
| benzo(a)pyrene | 20 |
| indeno(1,2,3-cd)pyrene + dibenzo(a,h)anthracene | 20 |
| carbazole | 20 |

TABLE 2-continued

| K001 PARAMETERS | Detection Limit Sediment Phase (ppm dry) |
|---|---|

However, the detection limits and hazardous constituents may vary according to the composition of the particular waste materials in the impoundment being treated by the process of the present invention.

To facilitate understanding the advantages and operation of the present invention, the following example is provided to particularly illustrate a method of decontaminating an impoundment in which waste-water and sludge from a pressure wood treating plant are stored.

EXAMPLE

A treatment unit was constructed by removing sludge from an area of an existing impoundment which was approximately 53 feet in diameter. A four-foot dike was built to separate the excavated area from the rest of the impoundment. The excavated sludge was stored in the remainder of the impoundment. The treatment area was graded into a bowl shape, as shown in FIG. 1. A wire-reinforced concrete slab 13 feet in diameter and 4 inches thick was poured at the base of the treatment unit. A liner made of urethane having a thickness of 30 mm was spread in the treatment unit and checked for leaks.

Clean water was pumped into the treatment unit using a flow meter to measure the volume of water added. The volume of water was marked at one-foot intervals on the side of the treatment unit. Water addition was stopped at the 8 foot mark and the volume of water added was recorded.

An aerator was positioned and started in the center of the treatment unit, as shown in FIG. 2. A lance pump was made available and operational at the treatment site in the event additional sediment agitation was needed.

An initial volume of sludge was added to the treatment unit. The volume of sludge was determined by filling the bucket of a front end loader with water from the pump used to fill the treatment unit. The level and volume of water which the bucket held was marked. The bucket was emptied and filled with sludge to the mark. Three quart-size samples of sludge were taken from the initial volume of sludge. The samples were placed in a clean 5 gallon pail and mixed well. The bucket of sludge then was added to the treatment unit, with the aerator continuously running to insure that all material was suspended. Sludge from the remainder of the impoundment was continuously added in the same manner until 2000 gallons of sludge was added to the treatment unit or until the maximum amount of sludge up to 2000 gallons could be suspended in the treatment unit. The amount of sludge which was added to the treatment unit was recorded.

An initial batch of commercially available mutant bacteria or microorganisms, nutrients and emulsifiers was added to the treatment unit. Initially, 25 pounds of mutant bacteria obtained from Polybac Corporation was added to the treatment unit. After the initial batch was added, 5 pounds of microorganisms were added to the treatment unit per week. Fifteen pounds of nutrients were initially added to the treatment unit, and after start-up, an adequate amount of nutrients to maintain 10 ppm NH-N and 4 ppm PO-P were added to the treatment unit. Twelve quarts of emulsifier were added to the treatment unit initially, and a sufficient amount of emulsifiers were periodically added to the treatment unit to maintain the organics in solution. The pH of the mixture in the treatment unit then was adjusted to between about 7 and 7.5. The amounts of all constituents added to the mixture in the treatment unit were recorded.

Samples were taken from the treatment unit after operating the aerator for one hour. The DO was measured with a probe on a pole while the aerator was running. After turning off the aerator, samples were taken at the sampling locations shown in FIG. 2, the samples being taken at least one foot below the surface. The DO uptake of the samples was measured, and the treatment unit was allowed to settle for one hour. Four samples of water and four samples of sediment were drawn from the location shown in FIG. 2, each sample being at least one quart.

The water samples were consolidated in a clean 5 gallon pail, mixed well, and a full-quart sample was drawn and sent, packed in ice, to a commercial laboratory for analysis of the following constituents and other data:
(1) TOC;
(2) ammonia nitrogen;
(3) orthophosphate;
(4) oil and grease;
(5) inorganic chloride;
(6) K001 hazardous constituents;
(7) pH; and
(8) % solids.

The remainder of the samples were returned to the treatment unit.

The four sediment samples were consolidated in a clean 5 gallon pail, mixed well, and a full-quart sample was drawn and sent, packed in ice, to a commercial laboratory for the following analysis:
(1) TOC;
(2) oil and grease;
(3) inorganic chloride;
(4) K001 hazardous constituents;
(5) pH;
(6) % solids; and
(7) density.

The remainder of the sediment samples were returned to the treatment unit and the aerator was restarted.

The treatment unit was monitored weekly by conducting the above-described sampling procedures and analysis. The pH, nutrient levels and emulsifier levels were adjusted on a weekly basis, as required.

The impoundment was considered environmentally safe and can be closed when the analysis of the water and sediment samples taken from the impoundment indicated that substantially all of the K001 hazardous constituents were below the detection limits set forth in Tables 1 and 2.

The procedure described in the preceding Example can be used to determine the optimum or maximum sludge feed rate for effective biodegradation. Upon determining the optimum process parameters for a particular impoundment, the method of the present invention can be operated in a continuous or semi-continuous manner. Moreover, the treatment units can be used individually, or several treatment units can be used jointly as mixing, oxygen transfer, and polishing cells. Thus, the treatment units may be used in a series or as a parallel treatment scheme, depending upon the individual site and the space available at the site being decontaminated.

As will be readily understood by those of ordinary skill in the art, minor modifications may be made in the invention described above without in any way departing from the spirit and scope of the invention. Accordingly, it is understood that the invention will not be limited to the exact details disclosed hereinabove, but will be defined in accordance with the appended claims.

What is claimed is:

1. A method of decontaminating an impoundment in which waste water and sludge are stored, said method comprising the steps of:
constructing a treatment unit by excavating the sludge from a portion of said impoundment, building a separation wall to separate said excavated portion of said impoundment from the remaining portion of said impoundment, grading said excavated portion of said impoundment into a bowl shape, pouring a slab in the base of said bowl-shaped portion, and placing a leak-proof liner in said bowl-shaped portion of said impoundment, the excavated sludge being stored in said remaining portion of said impoundment;
pumping clean water into said treatment unit until said water reaches a predetermined depth;
positioning and operating an aerator at the center of said water in the treatment unit;
adding the sludge in the remaining portion of said impoundment to said treatment unit;
adding a mixture of mutant bacteria, nutrients, and emulsifiers to said treatment unit;
adjusting the pH of the mixture in said treatment unit to between about 7 and 7.5; and
obtaining and analyzing samples from said treatment unit at regular intervals until said waste-water and sludge are substantially free of detectable hazardous constituents.

2. A method according to claim 1 wherein said impoundment contains waste-water and sludge from a pressure wood treating plant.

3. A method according to claim 1 which further comprises arranging multiple treatment units in series.

4. A method according to claim 1 which is conducted in a continuous manner.

* * * * *